United States Patent [19]

Ito et al.

[11] Patent Number: 5,110,392
[45] Date of Patent: May 5, 1992

[54] PRIMER COMPOSITION CONTAINING AN ORGANOMETALLIC COMPOUND FOR BINDING SUBSTRATES WITH A CYANOCRYLATE ADHESIVE

[75] Inventors: Kenji Ito; Kaoru Kimura, both of Nagoya, Japan

[73] Assignee: Toagosei Chemical Industry Co., Ltd., Tokyo, Japan

[21] Appl. No.: 518,657

[22] Filed: May 3, 1990

Related U.S. Application Data

[63] Continuation-in-part of Ser. No. 219,815, Jul. 14, 1988, abandoned, which is a continuation of Ser. No. 899,800, Aug. 25, 1986, abandoned, which is a continuation of Ser. No. 611,691, May 18, 1984, abandoned.

[30] Foreign Application Priority Data

| May 20, 1983 | [JP] | Japan | 58-87761 |
| Dec. 5, 1983 | [JP] | Japan | 58-228323 |
| Mar. 29, 1984 | [JP] | Japan | 59-59367 |

[51] Int. Cl.$^5$ .............................. C09J 5/04
[52] U.S. Cl. ............................ 156/314; 106/287.17; 106/287.23; 156/331.2; 427/412.1; 427/412.3; 427/412.4; 427/412.5

[58] Field of Search ............... 156/314, 331.2; 427/412.1, 412.3, 412.4, 412.5; 106/287.17, 287.23

[56] References Cited

U.S. PATENT DOCUMENTS 4,818,325 4/1989 Hiraiwa et al. .................. 156/331.2

OTHER PUBLICATIONS

Condensed Chemical Dictionary, p. 822, ©1977, 9th Edition.

Primary Examiner—John J. Gallagher
Attorney, Agent, or Firm—Cooper & Dunham

[57] ABSTRACT

A process for bonding a polyolefin, polyfluoroolefin, polyethylene terephthalate, polyacetal, nylon or plasticizer-rich soft polyvinyl chloride substrate to a like substrate or for bonding a polyolefin, polyfluoroolefin, polyethylene terephthalate, polyacetal, nylon or plasticizer-rich soft polyvinyl chloride substrates to another substrate which comprises applying to the surface of at least one of the substrates to be bonded together an adhesion promoter composition comprising 0.001-10 wt. % of at least one organometallic compound containing a metal selected from the group consisting of typical metals, applying a cyanoacrylate-based adhesive comprising an alpha-cyanoacrylate and bringing together the thus-treated surface of the substrates to be bonded.

12 Claims, No Drawings

PRIMER COMPOSITION CONTAINING AN ORGANOMETALLIC COMPOUND FOR BINDING SUBSTRATES WITH A CYANOCRYLATE ADHESIVE

This application is a continuation-in-part of application Ser. No. 219,815 filed Jul. 14, 1988, now abandoned which, in turn, is a continuation of application Ser. No. 899,800 filed Aug. 25, 1986, now abandoned, which, in turn, is a continuation of application Ser. No. 611,691 filed May 18, 1984, now abandoned.

This invention relates to a primer which is used as such in bonding non-polar or highly crystalline resin substrates together or bonding other material thereto with use of an α-cyanoacrylate.

(This invention has as its object to provide a primer satisfactorily useful in bonding together non-polar or highly crystalline resin substrates together or bonding another material to the resin substrate with use of an α-cyanoacrylate, the resin substrates having herefore been considered as difficult to bond together, bond the other material thereto, coat, paint and print thereon and being typified by polyethylene, polypropylene, polybutene, polyfluoroethylene, their copolymer and other polyolefin substrates as well as polyethylene terephthalate, polyacetal, nylon and soft PVC film (having a high content of a plasticizer) substrates.)

To render these substrates or materials improved in adhesiveness, there has heretofore been proposed a surface treating method which comprises subjecting the substrates, for example polyethylene or polypropylene, to flame treatment, corona discharge treatment, irradiation treatment or oxidizing treatment with a bichromate, sulfate or the like so as to produce polar groups such as a carbonyl group on the surface of the substrates. In addition, to make a resin, such as polyfluoroethylene, which is impossible to oxidize on the surface, improved in adhesiveness, there has been proposed a special chemical treatment such as lithium vapor treatment, heating treatment with an alkali in a helium stream or treatment of metallic sodium with liquid ammonia.

However, the proposed methods and treatments need special equipments, are complicated to carry out, are unable to uniformly treat every part of the surface of a substrate having a complicated shape and require great expenses, these being disadvantageous.

Various primers also have been proposed. For example, Japanese Patent Appln. Laid-Open Gazettes Nos. 52-98062, 56-141328 and 57-119929 have proposed primers prepared by dissolving a chlorinated polyethylene or chlorinated polypropylene or a fatty acid modified acrylated alkyd resin in an organic acid.

According to Japanese Pat. Appln. Laid-Open Gazette No. 58-8734, however, the primers so proposed are unsatisfactory in adhesiveness to a paint although they are satisfactory in adhesiveness to a polyolefin substrate, or, even if the paint and the polyolefin are satisfactory in adhesion to each other, the adhesiveness therebetween will undesirably decrease due to repetition of the cold/hot cycle.

Japanese Pat. Appln. Laid-Open Gazettes Nos. 54-124048, 54-124049 and 54-124095 have proposed a modified polyolefin prepared by incorporating solid rubber, an unsaturated carboxylic acid or the derivative thereof, and a radical generator in a polyolefin, however, according to Japanese Pat. Appln. Laid-Open Gazette No. 57-38827, the modified polyolefin will have undesirable effects on the adhesiveness of a paint formed thereon since the unreacted unsaturated carboxylic acid and the radical generator remain in the modified polyolefin.

Further, Japanese Pat. Appln. Laid-Open Gazettes Nos. 54-124050, 55-34270 and 55-84271 have proposed an improved resin composed essentially of a propylene/styrene/butadiene block copolymer and an inorganic filler, however, the improved resin so proposed seems to raise various problems as to poor weatherproofness of unpainted parts and low-temperature fragility due to the incorporation of the filler.

(If non-polar or highly crystalline resins such as polyolefin can be improved in adhesiveness or they can allow a coating, painting or print to be satisfactorily formed on the surface thereof,) they would be very conductive to various fields such as the automobile industry and electric appliance industry since they have many merits such as excellent properties, light weight, rust-proof and low cost as compared with metallic material.

In attempts to develop a surface treating method which is simple and speedy as compared with the conventional methods, in view of the abovementioned situations, the present inventors made intensive studies and, as the result of their studies, they developed desired primers which enable satisfactory adhesion, coating, painting and printing. This invention is based on this development or finding.

This invention relates to a primer comprising at least one organometallic compound, which is used in bonding non-polar or highly crystalline resin substrates together or bonding another material to the resin substrate with the use of an α-cyanoacrylate.

The expression "bonding another material to the resin substrate with the use of an α-cyanoacrylate" used herein is intended to mean, for example, the use of an α-cyanoacrylate in adhesion of a solid material such as a metal, glass, a synthetic resin, rubber, leather, stone, cloth, paper, wood or ceramics to the resin substrate (or the use thereof in coating or printing a resin substrate with a coating material, paint or printing ink.)

The primer of this invention is composed of one or more organometallic compounds in which the organic group is combined with a metal. Such organometallic compounds may be used in this invention irrespective of the kind, structure and the like thereof.

The organic groups contained in the organometallic compounds include alkyl, cycloalkyl, haloalkyl, alkenyl, cycloalkenyl, alkoxy, cycloalkoxy, aryl, aralkyl, aralkyloxy, acetylacetate, acyloxy and cycloalkenyloxy, aryloxy group, with $C_3$ or higher hydrocarbon groups being preferred. The metals contained in the organometallic compounds in this invention are intended to include typical metals, transition metals and metalloids and further include phosphorus, boron and silicon. The organometallic compounds are illustrated by the following structural formulae.

(1) M—O—R (wherein M is an elemental metal and R an organic group; these definitions apply to the following) which shows metal alcoholates:

organoaluminum compounds such as aluminum isopropylate, aluminum mono-sec. -butoxydiisopropylate, aluminum ethylacetoacetate diisopropylate, aluminum oleylacetoacetate diisopropylate; organotitanium compounds such as tetrabutyl titanate and tetraisopropyl titanate; organoboron compounds such as tri-n-butyl borate, triphenyl borate, tri-n-octadecyl borate and monobutyldimethyl borate; phosphoric acid esters such as trioleyl phosphate, tridecyl phosphate, dibutyl phosphite, trisisodecyl phosphite, di-2-ethylhexyl phosphite and tridecyl phosphite; tetraoctyl silicate; triisobutoxygallium; and tetrabutyl zirconate.

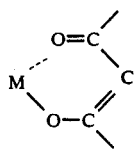

(2)

which shows 1,3-dicarbonyl complexes:

complex salts of acetylacetonate such as aluminum trisacetylacetonate, aluminum monoacetylacetonate bisethylacetoacetate, aluminum trisethylacetoacetate; acetylacetone lithium, acetylacetone beryllium, acetylacetone sodium, acetylacetone magnesium, acetylacetone calcium, acetylacetone titanium, acetylacetone strontium, acetylacetone barium, acetylacetone thallium, acetylacetone vanadium, acetylacetone manganese (III), acetylacetone iron (III), acetylacetone thorium, acetylacetone chromium (III), acetylacetone rhodium, acetylacetone cobalt (II), acetylacetone cobalt (III), acetylacetone nickel, acetylacetone copper, acetylacetone zinc, acetylacetone zirconium, acetylacetone palladium, acetylacetone indium, acetylacetone tin (IV) and acetylacetone molybdenum; complex salt of acetoacetic acid ester, trifluoroacetylacetone and benzoylacetone.

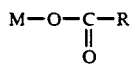

(3)

which shows carboxylates:

magnesium stearate, aluminum stearate, calcium stearate, ferric stearate, zinc stearate, barium stearate, lead stearate, potassium stearate, copper stearate, manganese stearate, nickel stearate, nickel naphthenate, cobalt naphthenate, manganese naphthenate, magnesium naphthenate, zinc naphthenate, magnesium palmitate, cadmium palmitate, cobalt palmitate, sodium linoleate, sodium laurate, barium oleate, aluminum laurate, aluminum oleate, potassium oleate, aluminum acetate, stannous acetate, stannous 2-ethylhexanoate, aluminum formoacetate, zinc tartrate and basic aluminum thiodiglycolate.

(4) M—R which shows hydrocarbon group-containing metals:

alkyl metals such as zinc 2-ethylhexyl, lithium hexadecyl, sodium n-hexyl, potassium hexadecyl, aluminum n-trioctyl, lead n-propylethyl, antimony tri-n-pentyl, antimony tri-n-decyl and zinc isobutylisoamyl; organotin compounds such as dibutyl tin diacetate, di-n-butyl tin dimaleate, di-n-butyl tin dioxide, triphenyl tin acetate, tri-n-butyl tin oxide, dioctyl tin dilaurate, tributyl tin acetate, tributyl tin chloride, tin tetraamyl and diallyl tin dichloride; methylvinyldichlorosilane; AY43-021 (tradename of Toray Silicon Co., Ltd.); ferrocene; titanocene dichloride; and nickelocene.

(5) M—X—R wherein X is a hetero atom such as the organometallic compounds, for example, metal thioalcoholates such as n-dodecylmercaptopotassium salt and aluminum trithiobutoxide; thiodicarboxylates such as tin 2-ethylhexanemonothioate and zinc 2-ethylhexanedithioate; dithiocarbamates such as nickel dimethyldithiocarbamate, copper dimethyldithiocarbamate, iron dimethyldithiocarbamate and zinc diethyldithiocarbamate; sulfonic acids such as nickel benzenesulfonate; phosphates such as vanadium dibutylphosphate; and zinc mercaptobenzothiazole.

Among these organometallic compounds, the carboxylates (3) and the hydrocarbon group-containing metals (4) are preferred, and the metal alcoholates (1) and the 1,3-dicarbonyl complex salts (2) are more preferred. More particularly, the preferred organometallic compounds include acetylacetone lithium, acetylacetone sodium, acetylacetone magnesium, acetylacetone titanium, acetylacetone iron (III), acetylacetone palladium, acetylacetone indium, tri-n-octadecyl borate, sodium linoleate, magnesium stearate, aluminum stearate, aluminum acetate, aluminum laurate, basic aluminum thiodiglycolate, calcium stearate, ferric stearate, ferrocene, copper dimethyldithiocarbamate, zinc stearate, zinc 2-ethylhexyl, zinc tartrate, stannous acetate, di-n-butyl tin maleate, di-n-butyl tin oxide, triphenyl tin acetate, barium stearate, lead stearate, dibutyl phosphite, tridecyl phosphate and trioleyl phosphate. The more preferred organometallic compounds include acetylacetone calcium, acetylacetone zinc, potassium oleate, nickel naphthenate and dioctyl tin dilaurate. The most preferred organometallic compounds include aluminum isopropylate, aluminum mono-sec.-butoxydiisopropylate, aluminum ethylacetoacetate diisopropylate, aluminum oleylacetoacetate diisopropylate, aluminum trisacetylacetonate, aluminum monoacetylacetonate bisethylacetoacetate, aluminum trisethylacetoacetate, acetylacetone manganese (III), acetylacetone cobalt (II), acetylacetone nickel, acetylacetone zinc, acetylacetone zirconium, tetrabutyl titanate, tetraisopropyl titanate, dibutyl tin diacetate, tri-n-butyl tin oxide, tin 2-ethylhexanoate, AY43-021 (tradename of a certain silicon compound produced by Toray Silicon Co., Ltd.) and trisisodecyl phosphite.

The primer composed of the organometallic compound or compounds according to this invention is used for coating on a non-polar or highly crystalline resin substrates in bonding the resin substrates together or bonding another material thereto with use of α-cyanoacrylate. In this case, it is desired to control the thickness of the organometallic compounds coated so that the full effects of this invention are attained as described later. (For this purpose, it is preferred that the compounds be used in solution.)

The solvents used herein are preferably capable of completely dissolving or dispersing the organometallic compound therein, has suitable volatility and is industrially easily available. The solvents are also preferably such that a resin, such as polyolefin, can be fully wetted on the surface therewith, in order to allow the primers to exercise their performance more efficiently. For this purpose, it is further preferable to selectively use an organic solvent which has a surface tension lower than the critical surface tension γc of the resin. The following Table indicates the surface tension and the critical surface tension of typical solvents to help one skilled in the art in selecting a solvent to be used.

TABLE

| Critical surface tension γc of resin (dyne/cm. 20° C.) | | Surface tension of organic solvent (dyne/cm. 20° C.) | |
|---|---|---|---|
| Polytrifluoroethylene | 22 | 1,1,2-trichloro-1,1,2-trifluoroethane | 19 |
| polyethylene | 31 | Ethanol | 22 |
| Polypropylene | 31 | Acetone | 23 |
| Polyacetal | 40 | Ethyl acetate | 24 |
| Polyvinylidene chloride | 40 | 1,1,1-trichloroethane | 26 |
| Polyethylene terephthalate | 43 | Tetrahydrofuran | 26 |
| 6-6 nylon | 46 | 1,4-dioxane | 27 |
| | | Toluene | 28 |

It is preferable that a solution of the organometallic compound in a solvent be in a concentration by weight of 0.001-10% for the reason that the organometallic compound may be coated to nearly thickness of monomolecular layer thereof whereby the compound can exhibit its best performance as described later.

The α-cyanoacrylate used in this invention is represented by the following general formula

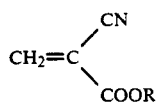

wherein R is alkyl, alkenyl, cycloalkyl, aryl, alkoxyalkyl, aralkyl, haloalkyl or the like and more particularly it is illustrated by methyl, ethyl, n-propyl, n-butyl, isobutyl, n-pentyl, allyl, cyclohexyl, benzyl or methoxypropyl.

The α-cyanoacrylates used herein are the main component of commercially available cyanoacrylate-based instant adhesives which may be used as they are, as α-cyanoacrylate in this invention.

The commercially available cyanoacrylate-based adhesives are composed mainly of α-cyanoacrylate and may be further incorporated with various ingredients as illustrated below:

(1) Stabilizer
(2) Thickener
(3) Modifier
(4) Dyestuff

The stabilizer is for enhancing the storage stability of the cyanoacrylate-based adhesives and is illustrated by sulfur dioxide, an aromatic sulfonic acid or a sultone as an anion polymerization inhibitor and by hydroquinone or hydroquinone monomethyl ether as a radical polymerization inhibitor.

The thickener used herein is for increasing the viscosity of the cyanoacrylate-based adhesives to several ten to several thousand cp since usually α-cyanoacrylate is a low viscous liquid having a viscosity of about several cp. The thickener used herein includes a polymethylmethacrylate, acryl rubber or cellulose derivative.

The modifier used herein is for improving the impact resistance or heat resistance which are drawbacks of conventional cyanoacrylate-based adhesives and is illustrated by maleic anhydride or a derivative thereof as an improver of heat resistance as indicated in Japanese Pat. Appln. Gazette No. 52-12737. To enable a porous and acidic sap-containing woody material which has heretofore been considered difficult to bond, to be bonded, crown compounds and the like may be used as indicated in, for example, Japanese Pat. Appln. Publication Gazette No. 55-2238.

Further, to provide a flexible adhesive layer, the original adhesive may be incorporated with a plasticizer such as tricresyl phosphate, dioctyl phthalate or dimethyl sebacate.

The dyestuff used herein is for, for example, rendering a bonded portion easily identifiable, the original adhesive may be incorporated with, for instance, an acidic salt of basic dye as indicated in Japanese Pat. Appln. Laid-Open Gazette No. 53-37260 or the like.

Furthermore, the original adhesive may further be incorporated with a perfume such as an ester derivative as indicated in Pat. Appln. Laid-Open Gazette No. 53-58541 or the like, in order to provide the adhesive with fragrance.

In the practice of this invention, the α-cyanoacrylate may be used in the form of a diluted solution in a specific organic solvent. The organic solvent should be such that it is compatible with the α-cyanoacrylate and does not impair the stability thereof, and it includes toluene, butyl acetate or methylchloroform. It is preferred that the organic solvent contains none of moisture and other impurities.

In a case where two substrates to be bonded together are each a non-polar or highly crystalline resin, coating of the organometallic compound may be effected by immersing both of the substrates in a solution of the primer for several seconds or coating it with the solution by the use of a brush or spray gun and then air drying, while in a case where only one of the substrates to be bonded together is a non-polar or highly crystalline resin, that substrate may be treated in the same manner as above.

The primer coated non-polar or highly crystalline resin substrates are bonded together or with another material using the α-cyanoacrylate to obtain a bonded body having very excellent bond strength.

In the coating method of the primer, there may also be used a method which comprises coating a mixture of the α-cyanoacrylate and the organometallic compound on a substrate with or without using organic solvent, or a method which comprises ejecting an α-cyanoacrylate and a solution of the organometallic compound simultaneously by the use of spray gun having two nozzles. In the former method, full care must be taken to prevent moisture, amines, alcohols and other foreign matters from mixing in the mixture since the α-cyanoacrylate specifically has a strong anionic activity.

In a process for forming a coating, painting or printing on a non-polar or highly crystalline resin substrate, the primer is coated on the resin substrate by the above-mentioned coating method, and then an α-cyanoacrylate is coated and polymerized to form a polymer film thereof, thus producing a resin substrate having satisfactory receptivity and bond strength to coating materials, paints and printing ink. The thus produced resin substrates may be coated or printed by a conventional means to form an excellent coating, painting and printing thereon.

In the coating steps the following steps will show more excellent effects in coatings.

In a first step, a primer prepared by dissolving the organometallic compound in an organic solvent to produce a primer composition comprising or consisting essentially of the organometallic compound in the organic solvent. The primer composition is coated on a substrate on which a coating, painting or printing is to be formed by an immersing or spraying method and being laid usually 5-60 minutes at room temperature or several days depending on the operational steps taken.

In a second step, the α-cyanoacrylate is coated on the primer-coated substrate to form a poly-α-cyanoacrylate film, by a coating method using a preliminarily acid-treated brush, an immersing method, a spraying method, or the like. In a case where the spraying method is used, it is preferred to use a diluted solution of α-cyanoacrylate in an organic solvent in order to prevent the nozzles of spray gun from being clogged.

In addition, in a case where a commercially available cyanoacrylate-based adhesive is used, it is preferable to choose the low viscosity one.

The substrate on which the α-cyanoacrylate has been coated is allowed to stand at room temperature for at least 12 hours to form a poly-α-cyanoacrylate film.

The poly-α-cyanoacrylate film is not particularly limited in thickness, but it is preferable that the thickness be in the range of $0.1-100\mu$, preferably $10-50\mu$ to eliminate defective coated portions.

The substrate on which the primer and α-cyanoacrylate have been coated as indicated above, is then coated with a usual coating material, painted with a paint or printed with a usual printing ink.

There are various kinds of coating materials, paints or printing inks which may be classified in various ways, however, they may be enumerated from the view-point of the kind of vehicle resin used, as follows:

rosin derivatives, nitrocellulose resins, vinylic resins, acrylic resins, polyester resins, polyamide resins, polyurethane resins, phenolic resins, epoxy resins, aminoalkyd resins, melamine resins and UV-curable acryl oligomers.

From the view-point of use, particularly preferred coating materials, paints or printing inks for use in applying to a polyolefin substrate are those containing a polyurethane resin, an epoxy resin, or an alkyd resin.

As to thermosetting coating materials, those which may be cured at a baking temperature of not higher than 90° C. are preferred.

A coating material or a paint may be applied by a usual method such as a coating method using a brush, a bar coater, a roller coater or a spray gun, while a printing ink may be applied by a usual method such as a silk screen printing method, a gravure printing method or a flexographic printing method.

It is not clear why the adhesiveness of a non-polar or highly crystalline resin to another material is improved by using the organometallic compound of this invention as the primer and the α-cyanoacrylate, however, the organometallic compounds will exhibit their best primer performance when they are very thinly coated to an extent that the amount thereof coated reaches 0.001 to 1 g/m² although the optimum thickness varies depending on the kind of the organometallic compound used.

Bonding tests were made by using a polypropylene plate (2 mm thick) as the resin substrate, acetylacetone zirconium (used as solutions of various concentrations in methylchloroform) as the primer, and an α-cyanoacrylate-based adhesive (produced under the tradename of Aron Alpha No. 201 by Toagosei Chemical Industry Co., Ltd.), to obtain bonded products which were measured for tensile shear strength at the bonded portion. The following Table A indicates the differences in tensile shear strength due to the differences in amount of the primer coated. The bonded products were aged at 23° C. under a relative humidity (RH) of 60% for one day.

TABLE A

| Conc. of primer (wt. %) | Amount of primer coated (g/m²) | Tensile shear strength (Kgf/cm²) |
|---|---|---|
| 5 | 0.5-2.5 | 3 |
| 3 | 0.3-1.5 | 10 |
| 1 | 0.1-0.5 | 15 |
| 0.5 | 0.05-0.25 | 36 |
| 0.25 | 0.025-0.125 | 55* |
| 0.05 | 0.005-0.025 | 60* |
| 0.025 | 0.0025-0.0125 | 27 |
| 0.01 | 0.001-0.005 | 11 |
| 0.001 | 0.0001-0.0005 | 3 |

Note:
The symbol "*" indicates the destruction of plate.

It is seen from the results in Table A that the primer will exhibit its best performance when it is coated in nearly the thickness of its monomolecular layer. From the above results and the fact that the organometallic compounds have a polar segment and non-polar segment in structure, it is surmised that the effects of this invention are produced under the following mechanism.

The organometallic compound, that is, the primer of this invention is present in approximately the monomolecular layer between the surface of the non-polar or highly crystalline resin substrate and the α-cyanoacrylate layer (monomer or polymer film layer) whereby the groups highly compatible with the resin layer and the groups highly compatible with the α-cyanoacrylate layer, in other words, the lipophilic groups and the polar groups are arranged in order and these groups act as a bonding agent to obtain the effects of this invention.

To obtain the best results in accordance with this invention, it is necessary to determine an organometallic compound to be used, the concentration of the compound, the amount thereof applied, and the like in view of the nature of the organometallic compound, a substrate and a material to be bonded thereto. As to the amount of the organometallic compound (primer) applied, the use of the primer in such a small amount that the resulting primer layer does not cover all the surface of the substrate which is needed, will naturally not give good results, whereas the use thereof in such a large amount that the resulting primer layer is thicker than the monomolecular layer, will result in forming a fragile primer layer whereby the results of this invention are not obtained. Thus, the concentration of solution of an organometallic compound (primer solution) is preferably 0.001-10% by weight and the amount of the primer coated is in the range of preferably 0.001-1 g/m², more preferably 0.01-0.1 g/m².

A secure bond is effected between a non-polar or highly crystalline resin substrate and an α-cyanoacrylate with aid of the organometallic compound present therebetween whereby the resin substrate is much improved in adhesiveness and, further, a usual coating material or printing ink can easily be applied to the treated resin substrate without causing any problems owing to the presence of a poly-α-cyanoacrylate film formed thereon.

The excellent effects obtained by the practice of this invention are those which may be attained by the combined use of the α-cyanoacrylate, organometallic compound and non-polar or highly crystalline resin substrate. On the other hand, in cases where a bond is attempted to be effected between polyolefin (such as polyethylene) and something, an organotitanium compound was once studied to find whether it is useful as a primer or preliminary treatment; in these cases, however, excellent effects were not appreciated since an epoxy, urethane, rubber or acrylic adhesive was used. These conventional means do not anticipate at all the present invention which will unexpectedly excellent effects when practiced.

The effects of this invention will be exhibited only when a non-polar or highly crystalline resin is used as the substrate, whereas they will not be exhibited when other materials (such as a metal, wood or porcelain) are used as the substrate.

The primer of this invention is effective for a non-polar or highly crystalline resin such as polyethylene terephthalate, polyacetal or nylon and is particularly effective for polyolefin such as polyethylene and polypropylene.

This invention will be better understood by the following examples and comparative examples.

EXAMPLE 1 AND COMPARATIVE EXAMPLE 1

0.3 g of each of aluminum mono-sec. butoxydiisopropylate, aluminum monoacetylacetonate diethylacetoacetate and aluminium trisethylacetoacetate were dissolved in 99.7 g of 1,1,1-trichloroethane to prepare a primer solution.

Two pieces, 25×100×0.2 mmt, of a polyethylene film were each brushed on one face with each of the thus prepared primer solutions and air dried for about 5 minutes. Thus the primer coated film pieces were bonded together about one half (½) of its length with Aron Alpha No. 221 (Trade name, cyanoacrylate-based adhesive produced by Toagosei Chemical Industry Co., Ltd.), and were then aged under a compressive load of 0.1 Kgf/cm$^2$ at room temperature for 24 hours to obtain a test piece.

The test pieces so obtained were each measured for peel bond strength at a pulling rate of 100 mm/min. using a Strograph W-type tester in accordance with JIS K6854-1977 (Example 1).

For comparison, the above procedure was followed except that the primer was not used (Comparative Example 1).

The results are as shown in Table 1.

TABLE 1

| | Bond Between polyethylene Films | | | | |
|---|---|---|---|---|---|
| | | | \multicolumn{3}{c}{Peel strength (Kgf/25 mm)} | | |
| | Primer used | Run | Max | Min | Ave |
| Example 1 | Al mono-sec. butoxydiisopropylate | 1 | 2.0* | 0.7 | 1.6 |
| | | 2 | 1.6* | 0.5 | 1.4 |
| | | 3 | 1.7* | 0.6 | 1.4 |
| | Al monoacetylacetonate diethylacetoacetate | 1 | 1.9* | 0.9 | 1.5 |
| | | 2 | 1.7* | 0.6 | 1.3 |
| | | 2 | 1.7* | 0.8 | 1.2 |
| | Al trisethylacetoacetate | 1 | 1.6* | 0.5 | 1.0 |
| | | 2 | 2.1* | 0.9 | 1.7 |
| | | 3 | 1.8* | 0.7 | 1.2 |
| Com. Example 1 | No primer used | 1 | | | 0 |
| | | 2 | | | 0 |
| | | 3 | | | 0 |

Note:
The symbol "*" indicates the destruction of films.

EXAMPLE 2 AND COMPARATIVE EXAMPLE 2

One gram of each of aluminum isopropylate and aluminum ethylacetoacetate diisopropylate were dissolved in 99 g of toluene to prepare a primer solution.

Two pieces, 12.7 mm square×38 mm, of each of polyethylene, polypropylene and polyacetal were ground with a smooth-cut plain file to obtain pieces having a smooth ground face. The thus obtained pieces were brushed with the primer solution and air dried for about 10 minutes. In each of the polymers coated with different primers, the two primer coated pieces were bonded together with Aron Alpha No. 201 (cyanoacrylate-based adhesive produced by Toagosei Chemical Industry Co., Ltd.), and were then aged under a compressive load of 0.1 Kgf/cm$^2$ at room temperature for 24 hours.

The thus obtained test pieces were measured for tensile bond strength at a pull rate of 20 mm/min. using a Strograph W-type tester in accordance with JIS K6861-1977.

For comparison, the above procedure was followed except that the primer was not used (Comparative Example 2).

The results are as shown in Table 2.

TABLE 2

| | | | Bond Between Polyethylene Substrates, Polypropylene Substrates Or Polyacetal Substrates | | |
|---|---|---|---|---|---|
| | | | \multicolumn{3}{c}{Tensile strength (Kgf/cm$^2$)} | | |
| | Primer used | Run | Polyethylene/ polyethylene | Polypropylene/ polypropylene | Polyacetal/ polyacetal |
| Example 2 | Al isopropylate | 1 | 45 | 43 | 134 |
| | | 2 | 38 | 47 | 111 |
| | | 3 | 41 | 39 | 130 |
| | Al ethylacetoacetate diisopropylate | 1 | 56 | 47 | 127 |
| | | 2 | 43 | 51 | 141 |
| | | 3 | 48 | 55 | 133 |
| Comparative Example 2 | No primer used | 1 | 13 | 16 | 90 |
| | | 2 | 16 | 11 | 71 |
| | | 3 | 10 | 13 | 83 |

EXAMPLE 3 AND COMPARATIVE EXAMPLE 3

0.5 g of each of aluminum oleylacetoacetate diisopropylate, aluminum isopropylate and aluminum ethylacetoacetate diisopropylate were dissolved in 99.5 g of 1,1,2-trichloro-1,2,2-trifluoroethane to prepare a primer solution. The two film pieces were treated and tested in the same manner as in Example 1 except using 25×100×0.1 mmt of a polytrifluoroethylene and Aron Alpha No. 221F (cyanoacrylate-based adhesive produced by Toagosei Chemical Industry Co., Ltd.).

For comparison, the above procedure was followed except that the primer was not used (Comparative Example 3). The results are as shown in Table 3.

TABLE 3

| Bond Between polytrifluoroethylene Films | | | | | |
|---|---|---|---|---|---|
| | | | Peel strength (gf/25 mm) | | |
| | Primer | Run | Max | Min | Ave |
| Example 3 | Al triisopropylate | 1 | 80 | 20 | 55 |
| | | 2 | 93 | 65 | 80 |
| | | 3 | 91 | 47 | 74 |
| | Al ethylacetoacetate diisopropylate | 1 | 145 | 60 | 113 |
| | | 2 | 120 | 17 | 110 |
| | | 3 | 119 | 52 | 105 |
| | Al oleylacetoacetate diisopropylate | 1 | 125 | 105 | 115 |
| | | 2 | 90 | 30 | 65 |
| | | 3 | 107 | 88 | 72 |
| Com. Example 3 | No primer used | 1 | | | 0 |
| | | 2 | | | 0 |
| | | 3 | | | 0 |

EXAMPLE 4 AND COMPARATIVE EXAMPLE 4

0.5 g of aluminum oleylacetoacetate diisopropylate was dissolved in 99.5 g of each of ethanol, ethyl acetate and tetrahydrofuran to prepare primer solutions.

Thereafter, the two film pieces were treated and tested in the same manner as in Example 1 except using 25×100×0.5 mmt of a PVC film and Aron Alpha No. 201.

For comparison, the above procedure was followed except that a primer was not used (Comparative Example 4). The results are as indicated in Table 4.

TABLE 4

| Bond Between Transparent Soft PVC Films | | | | | |
|---|---|---|---|---|---|
| | | | Peel strength (Kgf/25 mm) | | |
| | Solvent used | n | Max | Min | Ave |
| Example 4 | Ethanol | 1 | 10.0 | 2.2 | 6.7 |
| | | 2 | 8.4 | 1.9 | 5.9 |
| | | 3 | 9.2 | 1.8 | 6.3 |
| | Ethyl acetate | 1 | 9.6 | 2.3 | 7.3 |
| | | 2 | 7.7 | 1.5 | 6.6 |
| | | 3 | 7.1 | 1.8 | 6.1 |
| | Tetrahydrofuran | 1 | 8.2 | 2.4 | 7.0 |
| | | 2 | 6.7 | 1.2 | 5.8 |
| | | 3 | 9.3 | 1.9 | 6.5 |
| Com. Example 4 | No primer used | 1 | 0.4 | 0.2 | 0.3 |
| | | 2 | 0.3 | 0.1 | 0.2 |
| | | 3 | 0.3 | 0.1 | 0.2 |

EXAMPLE 5 AND COMPARATIVE EXAMPLE 5

The primers, polyolefin substrates and α-cyanoacrylate used were as follows:
1. primers
   (1) Acetylacetone zirconium
   (2) Acetylacetone manganese (III)
   (3) Acetylacetone nickel
   0.2 g of each of the above compounds, that is primers, were dissolved in 99.8 g of toluene to prepare a primer solution.
2. Substrates to be bonded
   (1) Polyethylene plate (25×100×2 mm)
   (2) Polypropylene plate (25×100×2 mm)
   (3) Polybutene plate (25×100×2 mm)
3. α-cyanoacrylate
   Aron Alpha No. 201

The procedure of Example 2 was followed except that different primers were used (Example 5).

For comparison, the above procedure was followed except that a primer was not used (Comparative Example 5).

The results are as shown in Table 5.

TABLE 5

| Bond Between Polyolefin Plates | | | | |
|---|---|---|---|---|
| | | Tensile shear strength (Kgf/cm$^2$) | | |
| | Primer used | Polyethylene | Polypropylene | Polybutene |
| Example 5 | Acetylacetone zirconium | 29 | 43* | 23 |
| | Acetylacetone manganese (III) | 26 | 45* | 25 |
| | Acetylacetone nickel | 34 | 44* | 22 |
| Com. Example 5 | No primer used | 3 | 4 | 3 |

Note:
The symbol "*" indicates the destruction of plates. The above values for tensile shear strength are each the average one of three test pieces.

EXAMPLE 6 AND COMPARATIVE EXAMPLE 6

The primers, substrates to be bonded, and α-cyanoacrylate used were as follows:
1. primers
   (1) di-n-butyltin diacetate
   (2) ferric stearate
   (3) trisisodecyl phosphite
   0.3 g of each of the above compounds (1) to (3) was dissolved in 99.7 g of methylchloroform to prepare a primer solution.
2. Substrates to be bonded
   (1) Polyacetal pate (25×100×3 mm)
   (2) Polyurethane plate (25×100×3 mm)
   (3) Ethylene-propylene-terpolymer (25×100×3 mm)
3. α-cyanoacrylate
   Aron Alpha No. 221

The procedure of Example 5 was followed, but varying the materials used (Example 6).

For comparison, the above procedure was followed except that the primer was not used (Comparative Example 6).

The results are as shown in Table 6.

TABLE 6

| Bond Between Sparingly Adhesive Plates | | | | |
|---|---|---|---|---|
| | | Tensile shear strength (kgf/cm$^2$) | | |
| | Primer used | Polyacetal | Polyurethane | EPT |
| Example 6 | Di-n-butyltin diacetate | 60* | 22 | 4* |
| | Ferric stearate | 34* | 17 | 4* |
| | Trisisodecyl phosphite | 57* | 23 | 4* |
| Com. Example 6 | No primer used | 8 | 11 | 2 |

*Destruction of plates
The above values for tensile shear strength are each the average one of three test pieces.

EXAMPLE 7 AND COMPARATIVE EXAMPLE 7

The primers, substrate to be bonded, and α-cyanoacrylate used were as follows:
1. Primers (1) Acetylacetone cobalt (III)
(2) Acetylacetone zinc 0.5% of each of the above primers was dissolved in 99.5 g of 1,1,2-trichloro-1,1,2-trifluoroethane to prepare a primer solution.

2. Substrates to be bonded
   Teflon film 25×100×0.1 mm
3. α-cyanoacrylate
   Aron Alpha No. 221F The procedure of Example 5 was followed, but varying the materials used (Example 7).

For comparison, the above procedure was followed except that a primer was not used (Comparative Example 7).

The results are as shown in Table 7.

TABLE 7

| | Bond Between Teflon Films | |
|---|---|---|
| | Primer used | Tensile shear strength (kgf/cm$^2$) |
| Example 7 | Acetylacetone cobalt (III) | 3.5* |
| | Acetylacetone zinc | 3.3* |
| Com. Example 7 | No primer used | 0.2 |

*Destruction of film
The above values for tensile shear strength are each the average one of three test pieces.

EXAMPLE 8 AND COMPARATIVE EXAMPLES 8–9

The primers, substrate to be bonded, and α-cyanoacrylate used were as follows:
1. Primers
   (1) Tetraisopropyl titanate
   (2) Tetrabutyl titanate 0.5 g of each of the above primers were dissolved in 99.5 g of methylchloroform to obtain a primer solution.

2. Substrate to be bonded
   (1) Polypropylene plate (25×100×2 mm)
3. α-cyanoacrylate
   Aron Alpha No. 201

The procedure of Example 5 was followed, but varying the materials used (Example 8).

For comparison, the above procedure was followed except that a two-liquid type epoxy adhesive (commercially available) was substituted for the Aron Alpha No. 201 (Comparative Example 8) and it was also followed except that a primer was not used (Comparative Example 9). The results are as indicated in Table 8.

TABLE 8

| | Comparison With Epoxy Type Adhesive | |
|---|---|---|
| | Tensile shear strength (kgf/cm$^2$) | |
| | Aron Alpha No. 201 (Example 8) | Two-liquid epoxy (commercially available) (Com. Example 8) |
| Tetraisopropyl titanate | 29* | 2.5 |
| Tetrabutyl titanate | 54* | 2.7 |
| No primer used (Com. Example 9) | 3.1 | 2.3 |

*Destruction of plates
The above values for tensile shear strength are each the average one of three test pieces.

COMPARATIVE EXAMPLES 10–12

The procedures of Example 8 and Comparative Examples 8 and 9, were each followed except that a chromium-plated steel plate, 25×100×1.6 mm, was substituted for the polypropylene plate. The results are as shown in Table 9.

TABLE 9

| | Effect Of Primer On Metal | |
|---|---|---|
| | Tensile shear strength (Kgf/cm$^2$) | |
| | Aron Alpha No. 201 (Com. Example 10) | Two-liquid type epoxy (commercially available) (Com. Example 11) |
| Tetraisopropyl titanate | 29 | 60 |
| Tetrabutyl titanate | 27 | 62 |
| No primer used (Com. Example 12) | 100 | 126 |

EXAMPLE 9 AND COMPARATIVE EXAMPLES 13–15

The primers, α-cyanoacrylate, substrate and paints used were as follows:
1. Primers
   (1) Acetylacetone magnesium
   (2) Acetylacetone copper
   (3) Di-n-butyltin dimaleate
   (4) Aluminum oleinate
   (5) Cobalt palmitinate 0.1 g of each of the above primers was dissolved in 99.9 g of tetrahydrofuran to obtain a primer solution.

2. α-cyanoacrylate
   Fifty (50) grams of ethyl α-cyanoacrylate were uniformly dissolved in 50 g of n-butyl acetate to prepare a solution of α-cyanoacrylate.
   Note: This solution also contained 100 ppm of sulfur dioxide gas and 500 ppm of hydroquinone.
3. Paints
   (1) Nitrocellulose lacquer enamel (blue color) spray type (produced by Nippon Paint Co., Ltd.)
   (2) Acryl resin-based paint (yellow color) (produced by Toagosei Chemical Industry Co., Ltd.)
   (3) Polyurethane-based paint, two-liquid type (brown color) (produced by Chugoku Paint Co., Lt.)
4. Substrate
   Polypropylene plate (100×100×2 mm)

First of all, the substrate was brushed on the surface with each of the primer solutions and air dried for 10 minutes. The primer coated substrate was further coated uniformly with the α-cyanoacrylate solution by the use of a spray gun and allowed to stand at room temperature for 24 hours.

The obtained substrate was uniformly painted by spraying method with each of the paints then allowed to stand at room temperature for three days.

The adhesion of the paint was evaluated by a cross-cut peel test in accordance with JIS k5400-1979 after the paint had been subjected to an exposure test at room temperature and under the following specific environmental conditions.

Environmental Exposure Conditions (1) UV/Wet cycle
   A cycle of UV-60° C./4 hours and Steam-40° C./4 hours was repeated 25 times.
   Apparatus: UVCON Tester (manufactured by Toyo Seiki Co., Ltd.)
(2) Heat resistance
   Heated in air at 80° C. for 24 hours.

Apparatus: Labooven (manufactured by Tabai Seisakusho Co., Ltd.)
(3) Waterproofness
Immersed in tap water at room temperature for 24 hours.
(4) Hot/cold impact
A cycle of −20° C./1 hr and 60° C./1 hr was repeated 30 times.
Apparatus: TSC-10A Model (manufactured by Tabai Seisakusho Co., Ltd.)
The results are as indicated in Table 10.
The performance of the overcoat in Example 9 was compared as follows.
The procedure of Example 9 was followed except that a primer and α-cyanoacrylate were not used (Comparative Example 13). The procedure of Example 9 was followed except that a primer was not used (Comparative Example 14) and it was also followed except that an α-cyanoacrylate was not used (Comparative Example 15).
The adhesion of the paints of Comparative Examples 13–15 are shown in comparison with that of Example 9 in Table 10.

(3) Nitrocellulose-based lacquer enamel (yellow color) spray type (produced by Kansai Paint Co., Ltd.)
4. Substrate
Polyethylene plate 100×100×2 mm
The procedure of Example 9 was followed except for immersion in the α-cyanoacrylate and being allowed to stand for 7 days after painted.
The painted bodies so obtained were measured for strength of bond between the paint and polyethylene substrate by a cross-cut peel test in accordance with JIS D0202.

COMPARATIVE EXAMPLE 16

The procedure of Example 10 was followed except that neither a primer nor an α-cyanoacrylate was used.

COMPARATIVE EXAMPLE 17

The procedure of Example 10 was followed except that the use of a primer was omitted.

COMPARATIVE EXAMPLE 18

The procedure of Example 10 was followed except

TABLE 10

| | | | Durability Of Adhesion Of Paint To Polypropylene Substrate | | | | |
|---|---|---|---|---|---|---|---|
| | | | | Cross-cut peel test | | | |
| | Primer used | Paint | Room temp. | After UV/Wet cycles | After hear resistance test | After waterproofness test | After cold/hot impact test |
| Example 9 | Acetylacetone magnesium | Nitrocellulose-based | 100/100 | 100/100 | 100/100 | 100/100 | 100/100 |
| | | Acryl resin-based | 100/100 | 100/100 | 100/100 | 100/100 | 100/100 |
| | | Polyurethane-based | 100/100 | 100/100 | 100/100 | 100/100 | 100/100 |
| | Acetylacetone copper | Nitrocellulose-based | 100/100 | 100/100 | 100/100 | 100/100 | 100/100 |
| | | Acryl resin-based | 100/100 | 100/100 | 100/100 | 100/100 | 100/100 |
| | | Polyurethane-based | 100/100 | 100/100 | 100/100 | 100/100 | 100/100 |
| | Di-n-butyltin dimaleate | Nitrocellulose-based | 100/100 | 100/100 | 100/100 | 100/100 | 100/100 |
| | | Acryl resin-based | 100/100 | 100/100 | 100/100 | 100/100 | 100/100 |
| | | Polyurethane-based | 100/100 | 100/100 | 100/100 | 100/100 | 100/100 |
| | Aluminum oleinate | Nitrocellulose-based | 100/100 | 100/100 | 100/100 | 100/100 | 100/100 |
| | | Acryl resin-based | 100/100 | 100/100 | 100/100 | 100/100 | 100/100 |
| | | Polyurethane-based | 100/100 | 100/100 | 100/100 | 100/100 | 100/100 |
| | Cobalt palmitinate | Nitrocellulose-based | 100/100 | 100/100 | 100/100 | 100/100 | 100/100 |
| | | Acryl resin-based | 100/100 | 100/100 | 100/100 | 100/100 | 100/100 |
| | | Polyurethane-based | 100/100 | 100/100 | 100/100 | 100/100 | 100/100 |
| Com. Example 13 | None | Nitrocellulose-based | 0/100 | 0/100 | 0/100 | 0/100 | 0/100 |
| | | Acryl resin-based | 0/100 | 0/100 | 0/100 | 0/100 | 0/100 |
| | | Polyurethane-based | 0/100 | 0/100 | 0/100 | 0/100 | 0/100 |
| Com. Example 14 | None | Nitrocellulose-based | 5/100 | 7/100 | 6/100 | 5/100 | 7/100 |
| | | Acryl resin-based | 9/100 | 5/100 | 4/100 | 7/100 | 5/100 |
| | | Polyurethane-based | 8/100 | 4/100 | 8/100 | 6/100 | 5/100 |
| Com. Example 15 | Acetylacetone magnesium | Nitrocellulose-based | 12/100 | 10/100 | 9/100 | 12/100 | 9/100 |
| | | Acryl resin-based | 9/100 | 11/100 | 14/100 | 15/100 | 9/100 |
| | | Polyurethane-based | 13/100 | 13/100 | 11/100 | 9/100 | 12/100 |

EXAMPLE 10 AND COMPARATIVE EXAMPLES 16–18

The primer, α-cyanoacrylate, paints and substrate used were as follows:
1. Primer
A solution of 0.2 g aluminum isopropylate in 99.8 g toluene.
2. α-cyanoacrylate
Ethyl α-cyanoacrylate (containing a stabilizer, 50 ppm of sulfur dioxide gas and 100 ppm of hydroquinone)
3. Paints
(1) Nitrocellulose-based lacquer enamel (blue color) spray type (produced by Nippon Paint Co., Ltd.)
(2) Nitrocellulose-based lacquer enamel (white color) spray type (produced by Kansai Paint Co., Ltd.)

that the use of an α-cyanoacrylate was omitted.
The results are as indicated in Table 11.

TABLE 11

| | Coating On Polyethylene Plate | | |
|---|---|---|---|
| | Cross-cut peel test Paint | | |
| | Lacquer enamel (blue color) | Lacquer enamel (white color) | Lacquer enamel (yellow color) |
| Example 10 | 100/100 | 100/100 | 100/100 |
| Com. Example 16 | 0/100 | 0/100 | 0/100 |
| Com. Example 17 | 6/100 | 7/100 | 5/100 |
| Com. Example | 12/100 | 10/100 | 14/100 |

EXAMPLE 11

The primers, α-cyanoacrylate, paints and substrate used were as follows:
1. Primers
   Aluminum monoacetylacetonate bis-ethylacetoacetate
   Aluminum ethylacetoacetate diisopropylate
   Aluminum trisethylacetoacetate
   Aluminum oleylacetoacetate diisopropylate
   0.3 g of each of the above primers was dissolved in 99.7 g of methylchloroform to prepare a primer solution.
2. α-cyanoacrylate
   Isopropyl α-cyanoacrylate (containing 50 ppm of sulfur dioxide gas and 100 ppm of hydroquinone as a stabilizer)
3. Paint
   Acryl resin-based paint (yellow color) (produced by Toagosei Chemical Industry Co., Ltd.)
4. Substrate
   Polypropylene plate, 100×100×2 mm The polypropylene plate was coated with each of the primers by the use of a brush and air dried for 5 minutes.

The thus primer coated plate was immersed in the α-cyanoacrylate, soon withdrawn and allowed to stand at room temperature for 24 hours.

Thereafter, the thus treated plate was brushed with the paint and then allowed to stand at room temperature for 7 days.

The results are as shown in Table 12.

TABLE 12

Coating On Polypropylene Plate

| Primer | Paint | Cross-cut peel test |
| --- | --- | --- |
| 0.3% solution of aluminum monoacetylacetonate bis-ethylacetoacetate in methylchloroform | Acryl resin-based paint (yellow color) | 100/100 |
| 0.3% solution of aluminum ethylacetoacetate diisopropylate in methylchloroform | Acryl resin-based paint (yellow color) | 100/100 |
| 0.3% solution of aluminum trisethylacetoacetate in methylchloroform | Acryl resin-based paint (yellow color) | 100/100 |
| 0.3% solution of aluminum oleylacetoacetate diisopropylate in methylchloroform | Acryl resin-based paint (yellow color) | 100/100 |

EXAMPLE 12

The primers, α-cyanoacrylate, paint and substrate used were as follows:
1. Primer
   A solution of 0.5 g aluminum mono-sec. butoxydiisopropylate in 99.5 g ethyl acetate.
2. α-cyanoacrylate
   A uniform mixture of 50 g isobutyl α-cyanoacrylate and 50 g ethyl acetate which contained 100 ppm of sulfur dioxide gas and 200 ppm of hydroquinone as stabilizers.
3. Paint
   Polyurethane-based paint, two-liquid type (brown color) (produced by Chugoku Paint Co., Ltd.)
4. Substrate
   Polypropylene plate, 100×100×2 mm The substrate, the polypropylene plate, was brushed with the primer and air dried for 5 minutes.

The plate so treated was uniformly coated with α-cyanoacrylate by a spray gun and allowed to stand at room temperature for 24 hours.

Thereafter, the polypropylene plate was coated uniformly with the paint and then allowed to stand at room temperature for 7 days.

The thus obtained painted product was subjected to a cross-cut peel test and an environmental exposure test to observe whether blisters, cracks and peeling were caused in the paint coat, thereby evaluating the performance thereof.

The results are as shown in Table 13.

TABLE 13

Durability of Coatings On Polypropylene Plate

| | Room temp. | UV/Wet × 25 times | 80° C./ 24 hrs | Water immersion 24 hrs | Cycle of −20° C./1 h →60° C./1 h × 30 times |
| --- | --- | --- | --- | --- | --- |
| State of coatings | | Unchanged | Unchanged | Unchanged | Unchanged |
| Cross-cut peel test | 100/100 | 100/100 | 100/100 | 100/100 | 100/100 |

EXAMPLE 13 AND COMPARATIVE EXAMPLE 19

1. Preparation of a Primer (Adhesion Promotor)

0.3 g of oleylacetoacetate-Aluminumdiisopropylate was dissolved in 99.7 g of 1,1,1-trichloroethane to prepare an adhesion promotor solution of 0.3 wt %.

2. Substrates

Substrates used in this Example and Comparative Example are as follows:
(1) Polyethylene (PE) (Hizex 5000H, trade name of a product made by Mitsui Petrochem. Ind., Ltd.)
(2) Polyacetal (POM) (Iupital F2002, trade name of a product made by Mitsubishi Gas Chem. Co., Ltd.)
(3) Nylon 66 (CM3001M, trade name of a product made by Toray Ind., Inc.)
(4) EPT (Ethylene-Propylene-Dien Terpolymer, EP27, trade name of a product made by Japan Synth. Rubber Co., Ltd.)

3. Adhesion Procedure

Two substrates, 25×50×2 mmt in size, of each test substrates were each scrubbed on one face with a cloth impregnated with the thus prepared primer (adhesion promotor) solution and air dried for about two minutes. One of the thus treated substrates was coated with Aron Alpha No. 201 and bonded by putting upon another substrate while slightly applying a finger-pressure.

The bonded surface area and curing condition are as follows:
bonded surface area: 3.125 cm$^2$
curing condition: 23° C., 60% RH/24 hrs.

4. Measurement of Tensile Shear Strength

The thus obtained substrates were measured for tensile shear strength at a pull rate of 50 mm/min. using a Strograph W-type tester.

For comparison, the above procedure was followed except that the primer (adhesion promotor) was not used.

5. Results

The results are as shown in Table 14.

TABLE 14

| Substrate | Tensile shear strength (kgf/cm$^2$) | |
|---|---|---|
|  | treated Example 13 | untreated Comp. Example 19 |
| Polyethylene (PE) | 35 | 2 |
| Polyacetal (POM) | 40* | 5 |
| Nylon 66 | 46 | 22 |
| EPT | 10* | 5 |

Note:
The symbol "*" indicates the destruction of the substrates.
The above values for tensile shear strength are each the average one of five test substrates.

As clearly seen from the Table 14, it is possible to bond strongly non-polar or crystalline resins by using the primer (adhesion promotor) solution according to the present invention.

EXAMPLE 14 AND COMPARATIVE EXAMPLES 20-21

Samples of substrate, each made of PP (polypropylene), PE (polyethylene), POM (polyacetal) and having a size, 25 mm in width, 50 mm in length and 2.0 mm in thickness were prepared. 30 weight % ethyl alcohol solution of dimethyl-p-toluidine (primer), which is a typical polymerization accelerator for a cyanoacrylate type adhesive known for long (see, U.S. Pat. No. 3,903,055), was coated on the surface of each sample substrate, and dried at room temperature to remove the ethyl alcohol (primer treatment). Then, a pair of substrates taken from each sample substrate were adhered together by using an instantaneous adhesive, Aron Alpha #201.

As a comparison, the same adhesion tests were performed by using samples coated with oleylacetoacetate-aluminumdiisopropylate, i.e. a primer (adhesion promotor) employed in Example 1 of the present specification, and also by using samples to which no primer was applied.

Table 14 shows the results of these tests. Values shown herein an average of tests repeated four times for each sample.

TABLE 15

| | Primer used | Tensile shear strength (kgf/cm$^2$) | | |
|---|---|---|---|---|
| | | Poly-propylene | Poly-ethylene | Poly-acetal |
| Example 14 | Primer of Example 1 | 42* | 36 | 40* |
| Comp. | Dimethyl-p- | 2.5 | 3.2 | 6.2 |

TABLE 15-continued

| | Primer used | Tensile shear strength (kgf/cm$^2$) | | |
|---|---|---|---|---|
| | | Poly-propylene | Poly-ethylene | Poly-acetal |
| Example 20 | toluidine | | | |
| Comp. Example 21 | No primer used | 1.5 | 2.5 | 4.0 |

Note:
The symbol "*" indicates the destruction of substrates.

As clearly seen from the Table 15, even if a pretreatment is applied to the samples by using dimethyl-p-toluidine solution (used as a primer), which is a polymerization accelerator, it was quite ineffective in improving the adhesive strength of these three kind of samples which are all low in polarity and high in crystallinity.

EXAMPLE 15 AND COMPARATIVE EXAMPLES 22-27

Samples of substrate, each made of PP (polypropylene), PE (polyethylene) and having a size, 25 mm in width, 50 mm in length and 2.0 mm in thickness were prepared. Various amine solutions (primer), which is illustrated in U.S. Pat. No. 3,260,637 as a typical polymerization accelerator for a cyanoacrylate type adhesive, were coated on the surface of each sample substrate, and dried at room temperature to remove the ethyl alcohol (primer treatment). Then, a pair of substrates taken from each sample was adhered together by using an instantaneous adhesive, Aron Alpha #201.

As a comparison, the same adhesion tests were performed by using samples coated with oleylacetoacetate-aluminumdiisopropylate, i.e. a primer (adhesion promotor) employed in Example 1 of the present specification, and also by using samples to which no primer was applied.

Table 16 shows the results of these tests. Values shown herein an average of tests repeated four times for each sample.

TABLE 16

| | Primer used | Tensile shear strength (kgf/cm$^2$) | |
|---|---|---|---|
| | | Polypropylene | Polyethylene |
| Example 15 | Primer of Example 1 | 57* | 15 |
| Comp. Example 22 | Phenyl ethyl ethanol amine (30%/methylene chloride) | 0 | 1.0 |
| Comp. Example 23 | Phenyl ethyl ethanol amine (1%/acetone) | 2.0 | 2.0 |
| Comp. Example 24 | Phenyl ethyl ethanol amine (30%/methylene chloride) | 1.2 | 0.6 |
| Comp. Example 25 | Phenyl ethyl ethanol amine (1%/methylene chloride) | 3.0 | 2.0 |
| Comp. Example 26 | Tri (n-propyl) amine (1%/acetone) | 18 | 9.2 |
| Comp. Example 27 | No primer used | 1.1 | 3.2 |

Note:
The symbol "*" indicates the destruction of substrates.

As clearly seen from the Table 16, even if these previously known polymerization accelerators are used as a primer, it was quite ineffective in improving the adhesive strength of these two kind of substrates. Even if these polymerization accelerators slightly contribute to improve adhesion strength, this effect cannot bear comparison with that of Example 14 according to the present invention.

COMPARATIVE EXAMPLES 28-30

Samples of substrate, each made of PP (polypropylene), PE (polyethylene) and having a size, 25 mm in width, 50 mm in length and 2.0 mm in thickness were prepared. Various solutions of nitrogen-containing compounds (primer), which is illustrated in U.S. Pat. No. 3,836,377 as a polymerization accelerator for a cyanoacrylate type adhesive, were coated on the surface of each sample substrate, and dried at room temperature to remove the ethyl alcohol (primer treatment). Then, a pair of substrates taken from each sample were adhered together by using an instantaneous adhesive, Aron Alpha #201.

As a comparison, the same adhesion tests were performed by using a sample to which no primer was applied.

Table 17 shows the results of these tests. Values shown herein an average of tests repeated four times for each sample.

TABLE 17

| | Primer used | Tensile shear strength (kgf/cm$^2$) | |
|---|---|---|---|
| | | Polypropylene | Polyethylene |
| Comp. Example 28 | N-(2-hydroxypropyl) morpholine (5%/acetone) | 1.0 | 0 |
| Comp. Example 29 | N-oxydiethylene benzothiazole-2-sulfenamide (0.1%/methylene chloride) | 3.0 | 2.0 |
| Comp. Example 30 | No primer used | 2.0 | 4.0 |

What is claimed is:

1. A process for bonding a polyolefin, polyfluoroolefin, polyethylene terephthalate, polyacetal, nylon or plasticizer-rich soft polyvinyl chloride substrate to a like substance or for bonding a polyolefin, polyfluoroolefin, polyethylene terephthalate, polyacetal, nylon or plasticizer-rich soft, polyvinyl chloride substrate to another substrate which comprises applying to the surface of at least one of the substrates to be bonded together an adhesion promoter composition consisting essentially of 90-99.999 wt. % organic solvent and 0.001-10 wt. % of at least one organometallic compound containing a metal selected from the group consisting of typical metals, applying a cyanoacrylate-based adhesive comprising an alpha-cyanoacrylate and bringing together the thus-treated surfaces of the substrates to be bonded.

2. A process according to claim 1, wherein the organometallic compound is a metal alcoholate selected from the group consisting of aluminum isopropylate, aluminum mono-sec butoxydiisopropylate, aluminum ethylacetoacetate diisopropylate, aluminum oleylacetoacetate diisopropylate, tri-n-butyl borate, triphenyl borate, tri-n-octadecyl borate, monobutyldimethyl borate, trioleyl phosphate, tridecyl phosphate, dibutyl phosphite, trisisodecyl phosphite, di-2-ethylhexyl phosphite, tridecyl phosphite, tetraoctyl silicate and triisobutoxygallium.

3. A process according to claim 1, wherein the organometallic compound is a 1,3-dicarboxyl complex salt selected from the group consisting of aluminum trisacetylacetonate, aluminum monoacetylacetonate bisethylacetoacetate, aluminum trisethylacetoacetate, acetylacetone lithium, acetylacetone beryllium, acetylacetone sodium, acetylacetone magnesium, acetylacetone calcium, acetylacetone strontium, acetylacetone barium, acetylacetone thallium, acetylacetone indium, acetylacetone tin (IV), acetoacetic acid ester, trifluoroacetylacetone and benzoylacetone complex salt.

4. A process according to claim 1, wherein the organometallic compound is a carboxylate which is selected from the group consisting of magnesium stearate, aluminum stearate, calcium stearate, barium stearate, lead stearate, potassium stearate, magnesium naphthenate, magnesium palmitate, sodium linoleate, sodium laurate, barium oleate, aluminum acetate, stannous acetate, stannous 2-ethylhexanoate, aluminum formoacetate and basic aluminum thiodiglycolate.

5. A process according to claim 1, wherein the organometallic compound is a compound of the formula M—X—R wherein M is a typical metal, X a hetero atom and R an organic group, which compound is selected from the group consisting of n-dodecylmercaptopotassium salt and aluminum trithiobutoxide.

6. A process according to claim 1, wherein the organometallic compound is a hydrocarbon group-containing metal compound which is selected from the group consisting of lithium hexadecyl, sodium n-hexyl, potassium hexadecyl, aluminum n-trioctyl and lead n-propylethyl.

7. A process according to claim 1, wherein the alphacyanoacylate is a compound represented by the formula

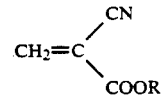

wherein R is an alkyl, alkenyl, cyclohexyl, aryl, alkoxyalkyl, aralkyl or haloalkyl radical.

8. A process according to claim 1, wherein said other substrate is a selected from the group consisting of metals, glass, synthetic resin, rubber, leather, stone, cloth, paper, wood and ceramic.

9. A process according to claim 1, wherein the amount of the applied adhesion promoter is 0.001-0.1 g/m$^2$.

10. A process according to claim 1, wherein the amount of the applied adhesion promoter is 0.01-0.1 g/m$^2$.

11. A process according to claim 1, wherein the adhesion promoter is applied by immersing the materials to be bonded in a solution of the adhesion promoter composition.

12. A process according to claim 1, wherein the adhesion promoter is applied by the use of a brush or spray gun.

* * * * *